(12) United States Patent
Shen et al.

(10) Patent No.: US 6,262,772 B1
(45) Date of Patent: Jul. 17, 2001

(54) METHOD AND APPARATUS FOR PREVENTING DISPLAY SCREEN BURN-IN

(75) Inventors: Richard C. Shen, Leonia, NJ (US); Alan Cavallerano, White Plains, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/198,057

(22) Filed: Nov. 23, 1998

(51) Int. Cl.[7] ................................................. H04N 11/22
(52) U.S. Cl. .......................... 348/445; 348/556; 348/558; 348/913; 348/469; 348/173
(58) Field of Search .................................. 348/445, 458, 348/449, 913, 556, 558, 173, 469

(56) References Cited

U.S. PATENT DOCUMENTS

| | | | |
|---|---|---|---|
| 4,556,906 | * 12/1985 | Dischert et al. | 348/556 |
| 5,223,929 | * 6/1993 | Sugimori et al. | 348/469 |
| 5,249,049 | * 9/1993 | Kranawetter et al. | 348/913 |
| 5,442,403 | * 8/1995 | Yasumoto et al. | 348/458 |
| 5,760,840 | * 6/1998 | Tani et al. | 348/558 |

FOREIGN PATENT DOCUMENTS

| | | | |
|---|---|---|---|
| 0514819A2 | 11/1992 | (EP) | H04N/5/44 |
| 0800311A1 | 10/1997 | (EP) | H04N/5/44 |

* cited by examiner

Primary Examiner—Reinhard J. Eisenzopf
Assistant Examiner—Trang U. Tran
(74) Attorney, Agent, or Firm—Edward W. Goodman

(57) ABSTRACT

When viewing a 4:3 aspect ratio image on a widescreen display, disturbing black bands appear to the left and right of the displayed image. Similarly, when viewing a letterbox image on a 4:3 aspect ratio display, disturbing black bands appear above and below the displayed image. These black bands result in uneven ageing of the phosphors in the display screen. An apparatus is provided which detects these black bands and automatically expands the image in the appropriate direction such that these black bands are automatically eliminated.

5 Claims, 4 Drawing Sheets

METHOD AND APPARATUS FOR PREVENTING DISPLAY SCREEN BURN-IN

BACKGROUND OF THE INVENTION

1. Field of The Invention

The subject invention relates to displaying images having a certain aspect ratio on display screens having a different aspect ratio.

2. Description of The Related Art

With the advent of widescreen displays in which the display screen has an aspect ratio of 16:9, a problem has arisen when images having an aspect ratio of 4:3 are displayed on the screen. In particular, as shown in FIG. 1A, the 4:3 aspect ratio image 1 is displayed on the screen with vertical black bands 2 and 3. Since at the present time, most video signals have the 4:3 aspect ratio, "burn in" may occur on the display screen where the screen phosphors are aged only in the area where the image is displayed. This then leads to distortions when viewing a true 16:9 image on the display.

Similarly, motion pictures are generally shot in a 16:9 aspect ratio. However, when that picture is reformatted for the standard 4:3 aspect ratio, information is lost. Now many motion picture studios release these motion pictures also in "letterbox" format in which the 16:9 image is compressed such that it fits the 4:3 aspect ratio. This is shown in FIG. 1B where the 16:9 image 4 appears between two horizontal black bands 5 and 6.

In addition to being detrimental to the display, the appearance of these vertical or horizontal black bands is disturbing to the user of the display and detracts from the viewing experience.

Conversion circuitry is know that is capable of expanding a displayed image both horizontally and vertically in order to eliminate these black bands. However, it is up to the user to decide when and which of these conversions is to be used.

SUMMARY OF THE INVENTION

It is an object of the invention to provide a method and apparatus for automatically eliminating both horizontal and vertical black bands from the borders of displayed images.

This object is achieved in a method for automatically eliminating horizontal and vertical black bands from the borders of a displayed video image, the method comprising the steps of performing a first detection of the occurrence of a black level in an input video signal for at least n lines at the beginning and end of a frame in the input video signal; performing a second detection of the occurrence of a black level in said input video signal for at least m pixels at the beginning and end of each line in a frame of the input video signal; vertically up-converting the lines in the input video signal in dependence on said first detection; and horizontally expanding the lines in the input video signal in dependence on said detection.

An apparatus for automatically eliminating horizontal and vertical black bands from the borders of a displayed video image, comprises first means for performing a first detection of the occurrence of a black level in an input video signal for at least n lines at the beginning and end of a frame in the video signal; second means for performing a second detection of the occurrence of a black level in an input video signal for at least m pixels at the beginning and end of each line in the video signal; means for vertically up-converting the lines in the video signal in dependence on said first detection; and means for horizontally expanding the lines in the video signal in dependence on said detection.

In a preferred embodiment of the invention, the first and second detections are performed for a predetermined number of fields (or frames) to insure that the black bands consistently persist. It should be understood that with this preferred embodiment, the black bands will appear on the display at least temporarily.

In order to prevent the black bands from being temporarily visible, the above method may alternatively include delaying the input video signal for at least one field (or frame) while the black level detection is being performed.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 2:
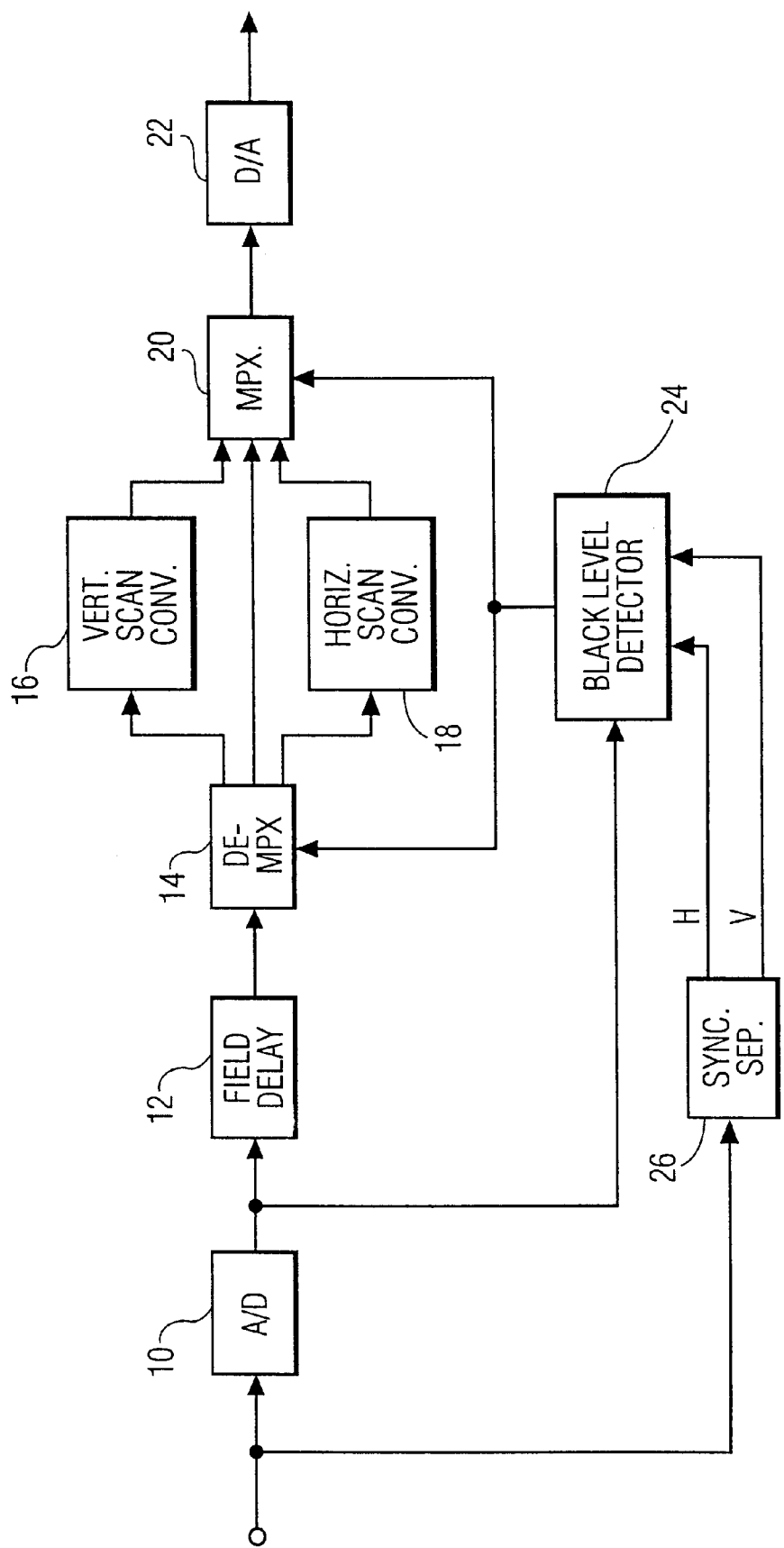
FIG. 2 shows a block diagram of an embodiment of the invention.

In FIG. 2, the apparatus is shown having an input for receiving an input video signal which is applied to an analog-to-digital (A/D) converter 10. The digitized video signal is then applied to a field (or frame) delay 12 and then to an input of a demultiplexer 14. The demultiplexer 14 has a first output connected to a vertical scan converter 16, a second output connected to a horizontal line expander 18, and a third output. A multiplexer 20 is also provided and includes a first input connected to an output of the vertical scan converter 16, a second input connected to an output of the horizontal line expander 18, and a third input connected to the third output of the demultiplexer 14. The output from the multiplexer 20 is connected to a digital-to-analog (D/A) converter 22, the output therefrom forming the output of the apparatus.

A black level detector 24 is provided for detecting a black level in the input video signal. To that end, an input of the black level detector 24 is connected to the output of the A/D converter 10. A synchronization signal separator 26 is connected to the input to receive the input video signal and supplies horizontal (H) and vertical (V) synchronization signals to the black level detector 24. If the black level detector 24 detects the black level for the first and last, for example, 20 lines in a frame (or the first and last 10 lines in a field) of the input video signal, the black level detector 24 causes the demultiplexer 14 to apply the delayed video signal to the vertical scan converter 16, and the multiplexer 20 to apply the output from the vertical scan converter 16 to the D/A converter 22. Similarly, if the black level detector 24 detects the black level for the first and last, for example, 20 pixels in each line in a frame (or field) of the input video signal, the black level detector 24 causes the demultiplexer 14 to apply the delayed video signal to the horizonal line expander 18, and the multiplexer 20 to apply the output from the horizontal line expander to the D/A converter 22. Of course, if the black level detector 24 does not detect the black level as such, the demultiplexer 14 applies the delayed video signal directly to the multiplexer 20 which, in turn, applies the delayed video signal to the D/A converter 22.

In an alternative embodiment, the field/frame delay 12 is omitted while the black level detector 24 examines the input video signal and does not switch the demultiplexer 14 or the multiplexer 20 until it detects the appropriate condition for several consecutive frames (or fields).

Figure 3A:
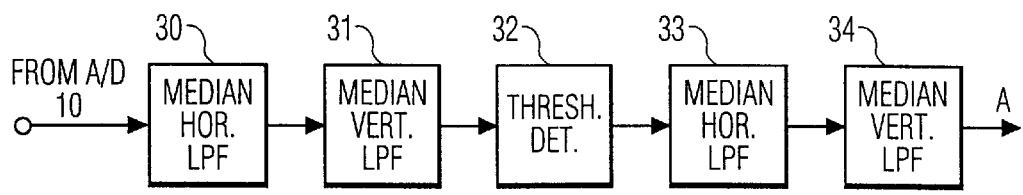
FIGS. 3A and 3B show an embodiment of the black level detector of FIG. 2.
Figure 3B:
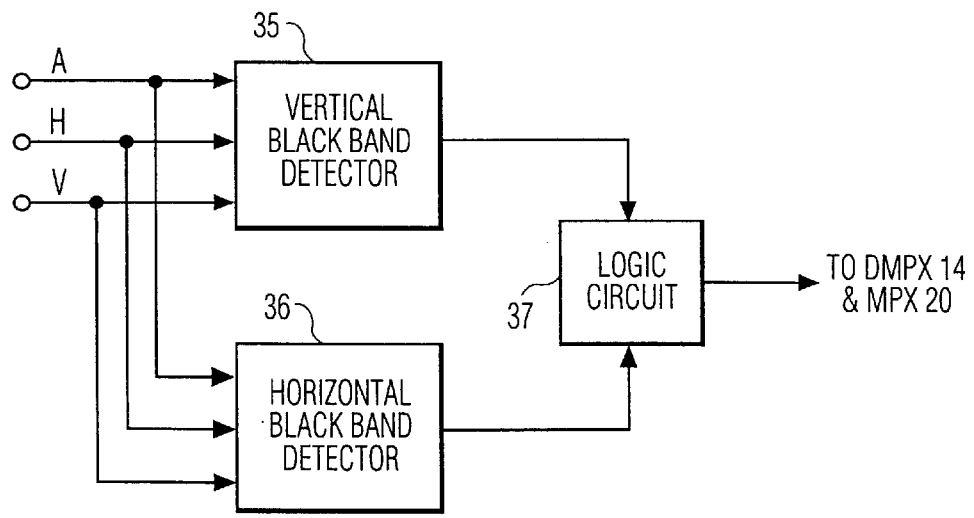

FIGS. 3A and 3B show an embodiment of the black level detector 24. As shown in FIG. 3A, the digitized video signal is filtered in a median horizontal low-pass filter 30, and a median vertical low-pass filter 31 to remove burst noise. A threshold detector 32 then provides a "0" output for all video pixel samples less than a threshold level, e.g., 5, and a "1" output for all video pixel samples greater than or equal to the threshold level. This reduces the incoming video image to a series of "0" and "1" values. It is expected that in the blank parts of the screen, these values would be "0". Of course, there may be "0" values naturally occurring within the actual video signal. The output from the threshold detector 32 is further smoothed by another series of median horizontal and vertical low-pass filters 33 and 34, to remove any spurious transitions.

Figure 1A:
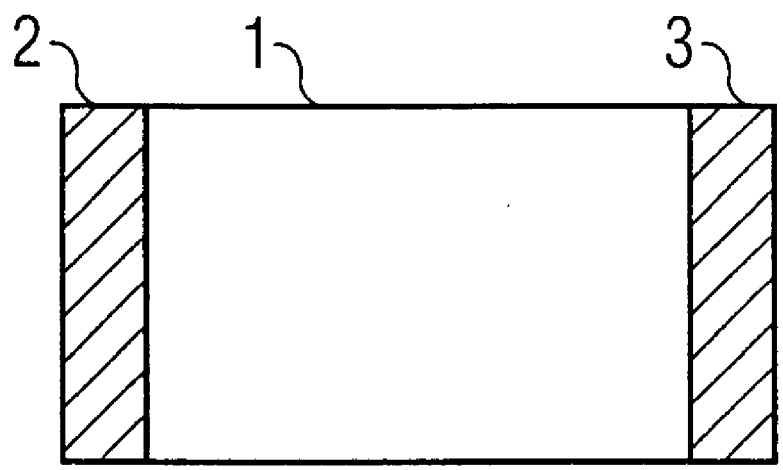
FIGS. 1A and 1B show illustrations of video displays with black bands appearing vertically on opposite ends and appearing horizontally at the top and bottom of respective video displays.
Figure 1B:
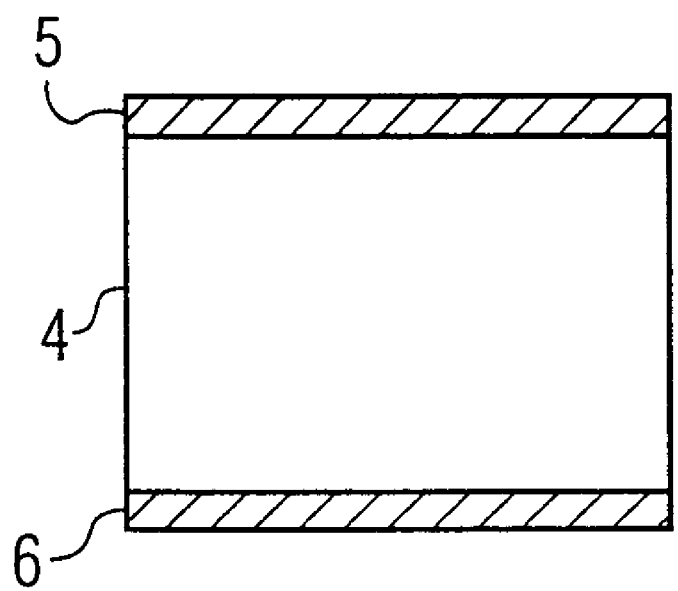

FIG. 3B shows, in block diagram form, circuitry for detecting the left and right black bands as well as the top and bottom black bands. In particular, the output A from the median vertical low-pass filter 34 and the horizontal and vertical synchronization signals H and V are applied to a vertical black band detector 35, for detecting the black bands 2 and 3 shown in FIG. 1A, and to a horizontal black band detector 36, for detecting the black bands 5 and 6 in Fig. 1B. The outputs from the vertical and horizontal black band detectors 35 and 36 are applied to a logic circuit 37 which, in turn, applies a switching signal to the demultiplexer 14 and the multiplexer 20. In particular, if the output from the vertical black band detector 35 is "1", the logic circuit 37 switches the demultiplexer 14 and the multiplexer 20 to the horizontal scan converter 18. Similarly, if the output from the horizontal black band detector 36 is "1", the logic circuit 37 switches the demultiplexer 14 and the multiplexer 20 to the vertical scan converter 16. If the outputs from the vertical and horizontal black band detectors 35 and 36 are both "0", the logic circuit 37 directly connects the demultiplexer 14 to the multiplexer 20.

Figure 4A:
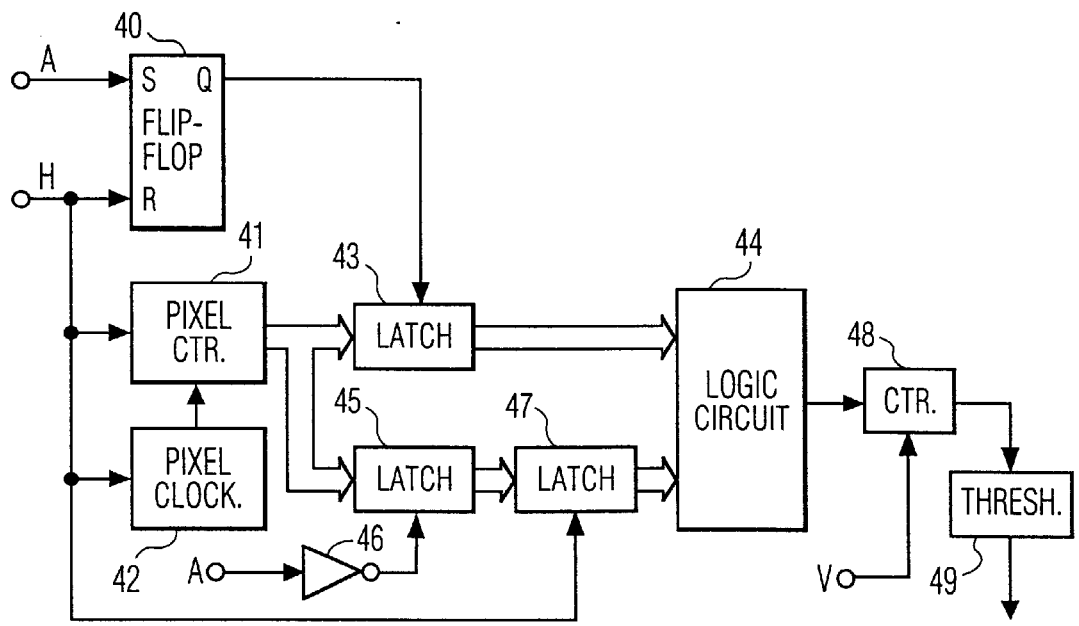
FIGS. 4A and 4B show embodiments of the vertical and horizontal black band detectors of FIG. 3B.

FIG. 4A shows an embodiment of the vertical black band detector 35. The output A from the median vertical low-pass filter 34 is applied the set input of a set-reset flip-flop 40, while the horizontal synchronization H is applied to the reset (R) input. The horizontal synchronization signal H is also applied to a reset input of a pixel counter 41 which counts a pixel clock signal supplied by a pixel clock 42 locked to the horizontal synchronization signal H. The pixel counter 41 thereby counts the pixels in a line of the input video signal. Assuming a black band on the left edge of the picture, the signal A is initially "0". At the time of a transition from "0" to "1", the set-reset flip-flop 40 applies a signal to a first latch 43 which then captures the current pixel count value n1 in the pixel counter 41. This count value n1 then is applied to a first input of a logic circuit 44. The output from the pixel counter 41 is also applied to a second latch 45 which receives, as a latch signal, the output A having first been inverted in an inverter 46. The second latch 47 captures the pixel count value at each occurrence of a "1" to "0" transition. However, since only the location of the last transition is desired, the output from this second latch 45 is applied to a third latch 47 which is latched by the horizontal synchronization signal H. The output n2 from this third latch 47 is applied to a second input of the logic circuit 44. The logic circuit 44 determines when the count value n1 from the first latch 43 exceeds a given number, e.g., 20, which would indicate that a left black band is present in a particular line, and determines when the count value n2 from the third latch 47 is smaller than a given number indicating the presence of a right black band. If both black bands are present in a given line, the logic circuit 44 outputs a "1" value. The output from the logic circuit 44 is applied to a counter 48 which is reset by the vertical synchronization signal V. The counter 48 counts the number of lines containing left and right black bands in a field. If this number exceeds a given number of lines, e.g., 260 lines, the threshold detector 48 applies a "1" value to its output, which is applied to the logic circuit 37.

In a modification (not shown) of this embodiment, the output values from the first and third latches 43 and 47 may be stored and averaged over all of the lines in any given field to determine average values of n1 and n2 for the field. Then these average field values may be further averaged over several fields to determine, with a high degree of accuracy, the locations of the left and right black borders. This averaging, in conjunction with the median filters and threshold detection, will mitigate potential false occurrences of the left and right black borders.

Figure 4B:
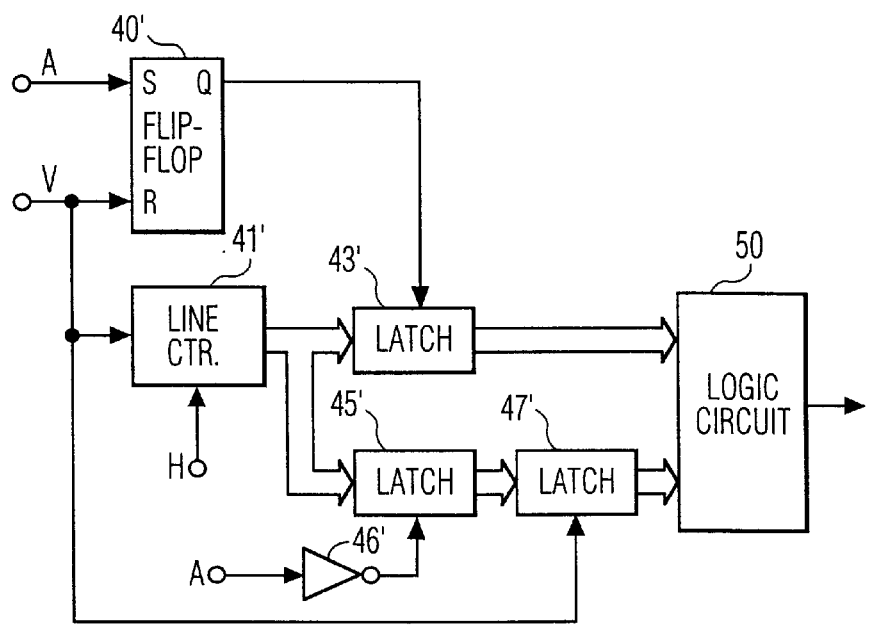

FIG. 4B shows an embodiment of the horizontal black band detector 36. In particular, The output A from the median vertical low-pass filter 34 is applied the set input of a set-reset flip-flop 40', while the vertical synchronization signal V is applied to the reset (R) input. The vertical synchronization signal V is also applied to a reset input of a line counter 41' which receives the horizontal synchronization signal H as a count input. The line counter 41' thereby counts the lines in the input video signal. Assuming a black band at the top of the picture, the signal A is initially "0". At the time of a transition from "0" to "1", the set-reset flip-flop 40' applies a signal to a first latch 43' which then captures the current line count value in the line counter 41. This count value is then applied to a first input of a logic circuit 50. The output from the line counter 41' is also applied to a second latch 45' which receives, as a latch signal, the output A having first been inverted in an inverter 46'. The output from this second latch 45' is applied to a third latch 47' which is latched by the vertical synchronization signal V. The output from this third latch 47' is then applied to a second input of the logic circuit 50. The logic circuit 50 determines when the count value from the first latch 43' exceeds a given number, e.g., 10, which would indicate that a top black band is present in a particular field, and determines when the count value from the third latch 47' is smaller than a given number, e.g., 255, indicating the presence of a bottom black band. If both bands are present in a given field, the logic circuit 44 outputs a "1" value, which is applied to the logic circuit 37.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An apparatus for automatically eliminating horizontal and vertical black bands from the border of a displayed video image, said apparatus comprising:

first means for performing a first detection of the occurrence of a black level in an input video signal for at least n lines at the beginning and end of a frame in the video signal;

second means for performing a second detection of the occurrence of a black level in an input video signal for at least m pixels at the beginning and end of each line in the video signal;

means for vertically up-converting the lines in the video signal in dependence on said first detection; and means for horizontally expanding the lines in the video signal in dependence on said detection, wherein said apparatus further comprises:

an input for receiving a video signal;

a demultiplexer having an input coupled to said input, a first output coupled to said vertically up-converting means, a second output coupled to said horizontal expanding means, a third output, and a control input;

a multiplexer having a first input coupled to an output of said vertically up-converting means, a second input coupled to an output of said horizontal expanding means, a third input coupled to the third output of said de-multiplexer, an output and a control input;

an output coupled to an output of said multiplexer for supplying an output video signal in which any black bands are suppressed; and a black level detector comprising said first and second detection means, said black level detector having an input coupled to said input of said apparatus and an output coupled to the control inputs of said demultiplexer and said multiplexer, wherein said black level detector switches said demultiplexer and said multiplexer to said first output and said first input, respectively, on said first detection, to said second output and said first input, respectively, on said second detection, and otherwise to said third output and said third input, respectively.

2. The apparatus as claimed in claim 7, wherein said first means and said second means perform said first and second detections simultaneously.

3. The apparatus as claimed in claim 7, wherein said first means and said second means perform said first and second detections for a predetermined number of consecutive frames.

4. The apparatus as claimed in claim 7, wherein n=20.

5. The apparatus as claimed in claim 7, wherein n=20.

* * * * *